United States Patent
Wang

(10) Patent No.: US 10,444,984 B2
(45) Date of Patent: Oct. 15, 2019

(54) DEVICE PROCESSING METHOD AND ELECTRONIC DEVICE

(71) Applicant: Lenovo (Beijing) Limited, Beijing (CN)

(72) Inventor: Lijun Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 0 days.

(21) Appl. No.: 15/473,117

(22) Filed: Mar. 29, 2017

(65) Prior Publication Data

US 2017/0285934 A1    Oct. 5, 2017

(30) Foreign Application Priority Data

Mar. 29, 2016 (CN) .......................... 2016 1 0188573

(51) Int. Cl.
*G06F 3/0488* (2013.01)
*G06F 1/16* (2006.01)
*G06F 3/046* (2006.01)

(52) U.S. Cl.
CPC ........ *G06F 3/04883* (2013.01); *G06F 1/1616* (2013.01); *G06F 1/1618* (2013.01); *G06F 1/1641* (2013.01); *G06F 1/1652* (2013.01); *G06F 1/1662* (2013.01); *G06F 3/046* (2013.01)

(58) Field of Classification Search
CPC ....... G06F 3/0321; G06F 3/041–04897; G06F 3/04883
See application file for complete search history.

(56) References Cited

U.S. PATENT DOCUMENTS

| 2002/0041271 A1* | 4/2002 | LeKuch | G06F 3/0483 |
| | | | 345/173 |
| 2006/0028457 A1* | 2/2006 | Burns | G06F 3/03545 |
| | | | 345/179 |
| 2010/0147601 A1* | 6/2010 | Choi | G06F 3/041 |
| | | | 178/18.03 |

* cited by examiner

*Primary Examiner* — Hang Lin
(74) *Attorney, Agent, or Firm* — Ference & Associates LLC

(57) ABSTRACT

One embodiment provides a method, including: receiving, at an electronic device, user input comprising a predetermined gesture; determining, using a processor, a first set of coordinates associated with the predetermined gesture; receiving, after the user input, another user input comprising the predetermined gesture at the electronic device; determining, using a processor, a second set of coordinates associated with the predetermined gesture of the another user input, wherein the second set of coordinates is different than the first set of coordinates; comparing the first and second sets of coordinates; and determining, based on the comparing, an offset between the first and second set of coordinates. Other aspects are described and claimed.

16 Claims, 4 Drawing Sheets

DEVICE PROCESSING METHOD AND ELECTRONIC DEVICE

CLAIM FOR PRIORITY

This application claims priority to Chinese Application No. 201610188573.0, filed on Mar. 29, 2016, which is fully incorporated by reference herein.

TECHNICAL FIELD

The subject matter described herein relates to the field of data control, and more particularly, to a device processing method and an electronic device.

BACKGROUND

Dual-screen electronic devices typically have a main screen and an auxiliary screen. The main screen is a conventional touch screen, and the auxiliary screen is an electromagnetic screen that supports the function of handwriting with a real pen. When in use, to electronically archive the handwritten text, or to realize electronic recording by means of handwriting, a piece of paper can be placed on top of the auxiliary screen for a user to make a handwritten note with an electromagnetic pen. During the handwriting process, the electromagnetic screen of the auxiliary screen can acquire the handwritten content by tracking the traces of the electromagnetic pen and displaying them on the main screen, and can simultaneously save them on the electronic device.

BRIEF SUMMARY

In summary, one aspect provides a method, comprising: receiving, at an electronic device, user input comprising a predetermined gesture; determining, using a processor, a first set of coordinates associated with the predetermined gesture; receiving, after the user input, another user input comprising the predetermined gesture at the electronic device; determining, using a processor, a second set of coordinates associated with the predetermined gesture of the another user input, wherein the second set of coordinates is different than the first set of coordinates; comparing the first and second sets of coordinates; and determining, based on the comparing, an offset between the first and second set of coordinates.

Another aspect provides an electronic device, comprising: a processor; a memory device that stores instructions executable by the processor to: receive user input comprising a predetermined gesture; determine a first set of coordinates associated with the predetermined gesture; receive, after the user input, another user input comprising the predefined gesture; determine a second set of coordinates associated with the predetermined gesture of the another user input, wherein the second set of coordinates is different than the first set of coordinates; compare the first and second set of coordinates; and determine, based on the comparing, an offset between the first and second set of coordinates.

A further aspect provides a product, comprising: a storage device that stores code, the code being executable by a processor and comprising: code that receives user input comprising a predetermined gesture; code that determines a first set of coordinates associated with the predetermined gesture; code that receives, after the user input, another user input comprising the predetermined gesture; code that determines a second set of coordinates associated with the predetermined gesture of the another user input, wherein the second set of coordinates is different than the first set of coordinates; code that compares the first and second sets of coordinates; and code that determines, based on the comparing, an offset between the first and second set of coordinates.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Once the piece of paper is moved away from the top of the auxiliary screen, it is difficult to move it back to its original position. Consequently, when writing again, the writing position on the piece of paper is continuous with the original writing position but the coordinates of the new writing position with respect to the electromagnetic screen have been changed from those of the original writing position, and are not continuous. As a result, the written content displayed on the main screen and saved is not continuous with the original ones, which makes the reading of the saved written content not smooth.

Figure 1:
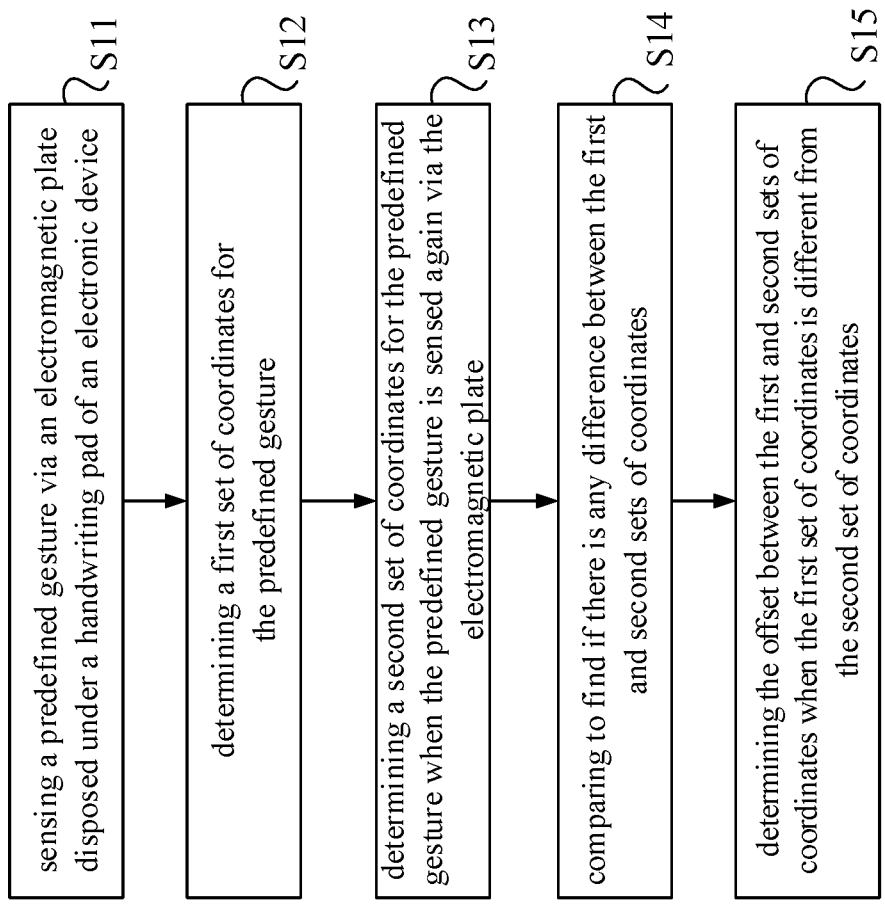
FIG. 1 is a schematic flow diagram illustrating a device processing method according to an embodiment.

The embodiments of the present application disclose a device processing method, the flow diagram of which is illustrated in FIG. 1.

At Step S11, an embodiment may sense a predefined gesture via an electromagnetic plate disposed under a handwriting pad of an electronic device. For a dual-screen electronic device, when the main screen is a conventional touch screen and the auxiliary screen is an electromagnetic screen that supports the function of handwriting with a real pen, a handwriting pad can be placed over the electromagnetic plate and there is a piece of paper on top of the pad. When a user writes on the piece of paper, the electromagnetic plate will sense the trace of the user's writing through the handwriting pad, thereby displaying the content or data written down on the piece of paper by the user on the main screen. The content or data displayed on the main screen is identical to that written down on the piece of paper by the user.

Among others, the predefined gesture may be a certain gesture, or a special symbol written down by a user with a pen on the piece of paper on top of the handwriting pad, or a special symbol written down by a user with a pen on the handwriting pad. For example, the predefined gesture may be a special symbol written down by a user with a pen on the piece of paper on top of the handwriting pad. After a user places a piece of paper on top of the handwriting pad, they can first use a pen to write down on the piece of paper a predefined trace which can be a special symbol or a certain pattern or a character and the like. The electromagnetic plate senses the predefined trace through the handwriting pad (i.e. senses the predefined gesture) and determines the coordinates of the predefined trace on the electromagnetic plate, to determine the precise position of the predefined trace on the electromagnetic plate.

At Step S12, an embodiment may determine a first set of coordinates for the predefined gesture.

At Step S13, an embodiment may determine a second set of coordinates for the predefined gesture when the predefined gesture is sensed again via the electromagnetic plate. When the piece of paper placed on top of the handwriting pad moves, or it has been picked up and then put back down, its new position has been changed from the original position (i.e., its position relative to the electromagnetic plate has been changed). Then, when the piece of paper is put back on top of the handwriting pad and the predefined trace is redrawn on its original position on the piece of paper, the electromagnetic plate is able to sense the predefined trace and determine its coordinates. That is, the electromagnetic plate is able to determine a second set of coordinates, on the electromagnetic plate at this time, to redetermine the precise position of the predefined trace with respect to the electromagnetic plate.

At Step S14, an embodiment may compare the first and second sets of coordinates to find if there is any difference between the two sets of coordinates. When the piece of paper is picked up and then put back down, or it moves, its position relative to the electromagnetic plate will usually be changed. Since the position of the predefined trace on the piece of paper is constant, the positions of the predefined trace sensed via the electromagnetic plate for the first and second times are usually different, (i.e., the first and second sets of coordinates are usually different). When the piece of paper is picked up and then put back down, only if the piece of paper is put back to the exact position that is not different from the original one, in this case, the first and second sets of coordinates can be identical.

At Step S15, an embodiment may determine the offset between the first and second sets of coordinates when the first set of coordinates is different from the second set of coordinates. After determining the offset between the first and second sets of coordinates (i.e., the offset between the initial and subsequent positions of the piece of paper is determined), it is then possible to adjust the position of the written content displayed on the main screen according to the offset between those two positions of the piece of paper such that the content displayed on the main screen is more consistent and easy to save and read later.

In the device processing method disclosed in the embodiment, a predefined gesture is sensed via an electromagnetic plate disposed under a handwriting pad of an electronic device. A first set of coordinates for the predefined gesture is determined. When the predefined gesture is sensed again via the electromagnetic plate, a second set of coordinates for the predefined gesture is determined. If the first and second sets of coordinates are different, the offset between them is then determined. Based on the offset between the first and second sets of coordinates, this method is able to determine the offset between the positions on the handwriting pad before and after a change so as to maintain continuous data input before and after the change of positions on the handwriting pad between its saved form on the electronic device and its inputted form on the handwriting pad. Therefore, the data input before and after the change of positions on the handwriting pad can be saved continuously on the electronic device.

Figure 2:
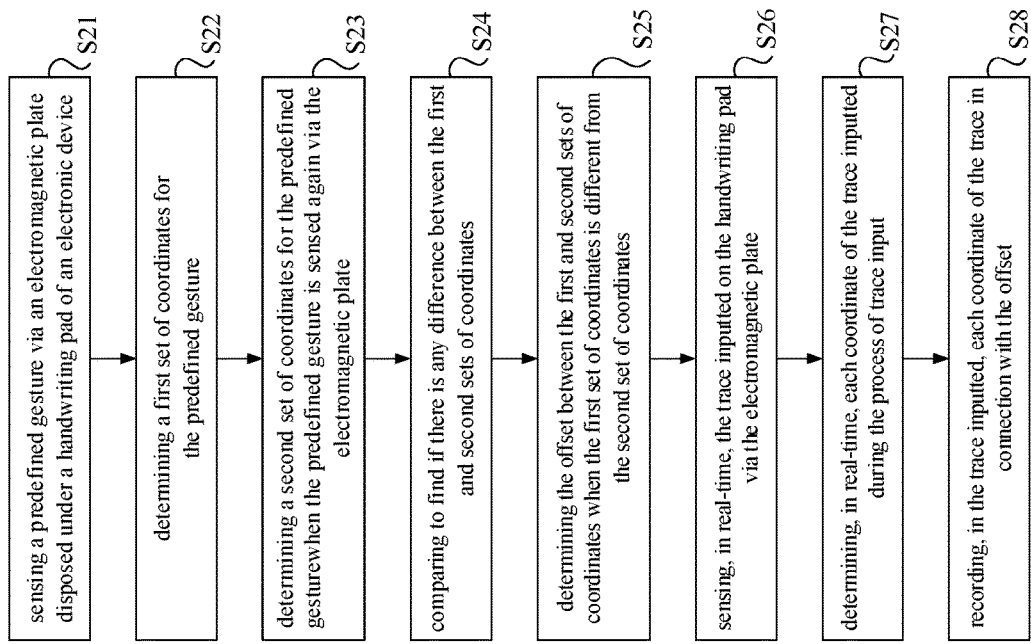
FIG. 2 is a schematic flow diagram illustrating a device processing method according to an embodiment.

An embodiment discloses a device processing method, the flow diagram of which is as illustrated in FIG. 2.

At Step S21, an embodiment may sense a predefined gesture via an electromagnetic plate disposed under a handwriting pad of an electronic device. For a dual-screen electronic device, when the main screen is a conventional touch screen and the auxiliary screen is an electromagnetic screen that supports the function of handwriting with a real pen, a handwriting pad can be placed over the electromagnetic plate and there is a piece of paper on top of the pad. When a user writes on the piece of paper, the electromagnetic plate will sense the trace of the user's writing through the handwriting pad, thereby displaying the content or data written down on the piece of paper by the user on the main screen. The content or data displayed on the main screen is identical to that written down on the piece of paper by the user.

Among others, the predefined gesture may be a certain gesture, or a special symbol written down by a user with a pen on the piece of paper on top of the handwriting pad, or a special symbol written down by a user with a pen on the handwriting pad. For example, the predefined gesture may be a special symbol written down by a user with a pen on the piece of paper on top of the handwriting pad. After a user places a piece of paper on top of the handwriting pad, they can first use a pen to write down on the piece of paper a predefined trace which can be a special symbol or a certain pattern or a character and the like. The electromagnetic plate senses the predefined trace through the handwriting pad (i.e. senses the predefined gesture) and determines the coordinates of the predefined trace on the electromagnetic plate, to determine the precise position of the predefined trace on the electromagnetic plate.

Alternatively, it may be that the handwriting pad is placed over the electromagnetic plate without a piece of paper and the content is input on the handwriting pad with a stylus or other pen-like devices only. Once the electromagnetic plate senses the trace on the handwriting pad, the content or data input by the user on the handwriting pad will be displayed on the main screen. In this case, the user cannot see the content he/she input directly on the handwriting pad, but has to look at it on the main screen.

In this case, there is no position change of the piece of paper, however, the user may not recall the position of the previous writing on the handwriting pad after a brief pause. As a result, it is necessary to input the predefined gesture (i.e., the predefined trace at first before inputting the content on the handwriting pad for the first time) so as to determine the initial input position on the handwriting pad. Before inputting the content on the handwriting pad again, a user may input the predefined trace again to redetermine the initial input position on the handwriting pad so that when inputting content on the handwriting pad again, the position of the content input displayed on the main screen will be connected to the tail of the content initially input. This prevents the content inputted from overlapping or being far apart from each other on the main screen, which makes it hard to save or read.

At Step S22, an embodiment may determine a first set of coordinates for the predefined gesture.

At Step S23, an embodiment may determine a second set of coordinates for the predefined gesture when the predefined gesture is sensed again via the electromagnetic plate. Specifically, in the case of the predefined gesture is a special symbol written down by a user with a pen on the piece of paper on top of the handwriting pad, when sensing the predefined gesture via the electromagnetic plate disposed under the handwriting pad of the electronic device and determining the first set of coordinates for the predefined gesture, the piece of paper is at a first position on the handwriting pad. When the predefined gesture is sensed again via the electromagnetic plate and determining the second set of coordinates, the piece of paper is at a second position on the handwriting pad, which is different from the first one.

When the predefined gesture is sensed again via the electromagnetic plate and the second set of coordinates for the predefined gesture are determined, an embodiment may confirm that the piece of paper is at the second position on the handwriting pad.

Steps S24-S25 are equivalent to steps S14-S15 in FIG. 1, which have been described above and are not duplicated here.

At Step S26, an embodiment may sense, in real-time, the trace inputted on the handwriting pad via the electromagnetic plate. The electromagnetic plate senses, in real-time, the trace inputted on the handwriting pad, wherein, the trace inputted comprises the predefined gesture (i.e., the predefined trace) and further comprises the particular content inputted by a user that needs to be saved or displayed. Additionally, the trace inputted on the handwriting pad that is sensed via the electromagnetic plate may comprise the trace inputted by a user on the piece of paper as well as the trace inputted by a user on the handwriting pad.

At Step S27, an embodiment may determine, in real-time, each coordinate of the trace inputted during the process of trace input. When the trace inputted is the predefined trace inputted before inputting any particular content, real-time determination of each coordinate of the trace inputted can precisely determine the exact position of the predefined trace so as to determine the exact position of the piece of paper or the initial input position on the handwriting pad. When the trace inputted is the particular content inputted after con-firming the predefined trace, real-time determination of each coordinate of the trace inputted can precisely determine the exact shape of the content inputted so that the content displayed on the main screen and the content inputted by the user are identical. It can also precisely determine the exact position of the trace inputted by determining each coordinate of the trace inputted so that the position of the content inputted displayed on the main screen does not shift.

At Step S28, an embodiment may record, in the trace inputted, each coordinate of the trace in connection with the offset.

In an embodiment, the trace inputted may be recorded in connection with the offset. For example, after the first input, the set of coordinates for the last content inputted is $(X_1,Y_1)$, so the offset is $(\Delta x, \Delta y)$. If the set of coordinates for the initial input the second time is $(X_2',Y_2')$, the final set of coordinates for the content inputted the second time $(X_2,Y_2)$ should adjust the set of coordinates for the initial input the second time $(X_2',Y_2')$ according to the offset $(\Delta x',\Delta y)$ and the set of coordinates for the last content inputted the first time $(X_1, Y_1)$ to allow the initial content inputted the second time and the last content inputted the first time to be adjacent, not overlapping, not far apart, and to keep the two inputs continuous.

In the device processing method disclosed in the embodiment, a predefined gesture is sensed via an electromagnetic plate disposed under a handwriting pad of an electronic device. A first set of coordinates for the predefined gesture is determined. When the predefined gesture is sensed again via the electromagnetic plate, a second set of coordinates for the predefined gesture is determined. If the first and second sets of coordinates are different, the offset between them is then determined. Based on the offset between the first and second sets of coordinates, this method is able to determine the offset between the positions on the handwriting pad before and after a change so as to maintain continuous data inputted before and after the change of positions on the handwriting pad between its saved form on the electronic device and its inputted form on the handwriting pad. Therefore, the data inputted before and after the change of positions on the handwriting pad can be saved continuously on the electronic device.

Figure 3:
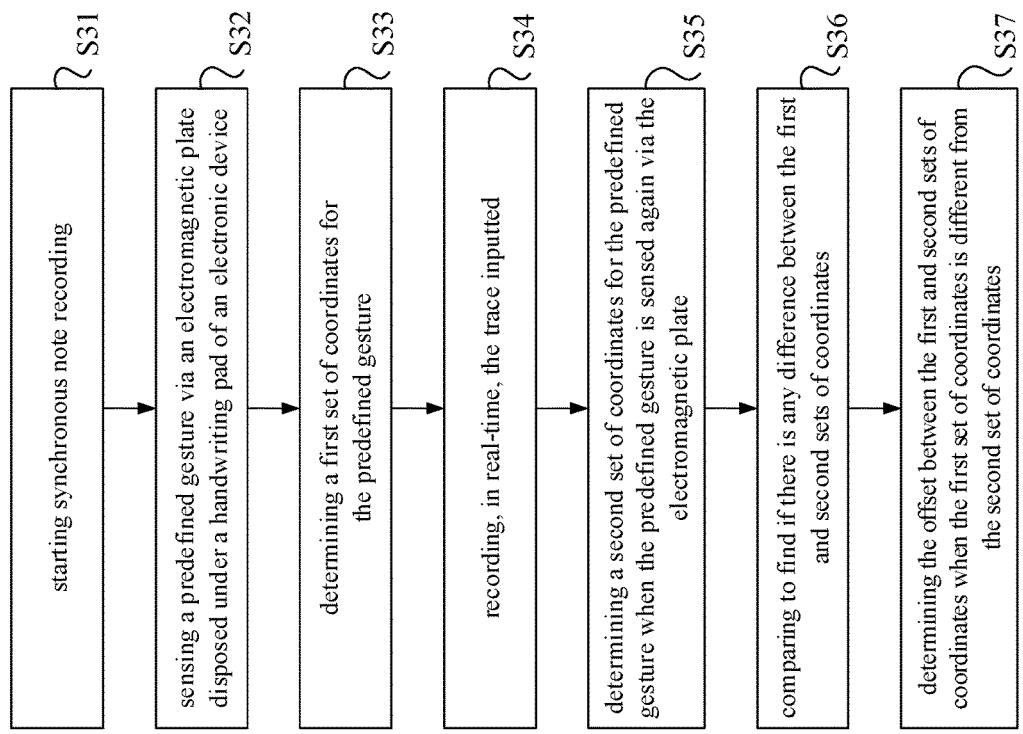
FIG. 3 is a schematic flow diagram illustrating a device processing method according to an embodiment.

This embodiment discloses a device processing method, the flow diagram of which is as illustrated in FIG. 3.

At Step S31, an embodiment may start synchronous note recording.

Synchronous note recording may be started to ensure the content written down by the user on the piece of paper placed on top of the handwriting pad can be synchronously recorded into the electronic device and displayed on it. Without synchronous note recording, the content written down by the user on the piece of paper cannot be synchronously recorded into the electronic device, even if a handwriting pad is placed over an electromagnetic plate, a piece of paper is put on top of the handwriting pad, and the user writes on the piece of paper.

At Step S32, an embodiment may sense a predefined gesture via an electromagnetic plate disposed under a handwriting pad of an electronic device. At Step S33, an embodiment may determine a first set of coordinates for the predefined gesture.

At Step S34, an embodiment may record, in real-time, the trace inputted. Once the first set of coordinates for the predefined gesture is determined, the position of the piece of paper is determined. At this point, the content inputted again on the piece of paper is the content the user needs to save on the electronic device. Accordingly, after the first set of coordinates is determined, the trace inputted has to be recorded, in real-time, to ensure the trace inputted by the user with a pen can be electronically saved with continuity.

At Step S35, an embodiment may determine a second set of coordinates for the predefined gesture when the predefined gesture is sensed again via the electromagnetic plate. At Step S36, an embodiment may compare to find if there is any difference between the first and second sets of coordinates.

At Step S37, an embodiment may determine the offset between the first and second sets of coordinates when the first set of coordinates is different from the second set of coordinates.

In the device processing method disclosed in the embodiment, a predefined gesture is sensed via an electromagnetic plate disposed under a handwriting pad of an electronic device. A first set of coordinates for the predefined gesture is determined. When the predefined gesture is sensed again via the electromagnetic plate, a second set of coordinates for the predefined gesture is determined. If the first and second sets of coordinates are different, the offset between them is then determined. Based on the offset between the first and second sets of coordinates, this method is able to determine the offset between the positions on the handwriting pad before and after a change so as to maintain continuous data inputted before and after the change of positions on the handwriting pad between its saved form on the electronic device and its inputted form on the handwriting pad. Therefore, the data inputted before and after the change of positions on the handwriting pad can be saved continuously on the electronic device.

Figure 4:
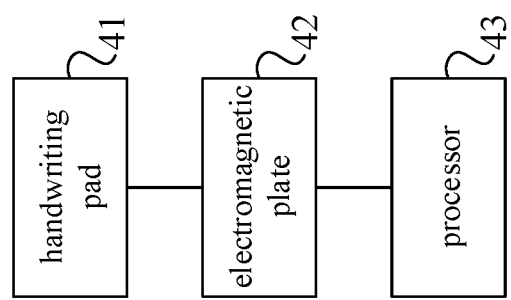
FIG. 4 is a structural schematic diagram of an electronic device according to an embodiment.

Referring now to FIG. 4, an embodiment discloses an electronic device, the structural diagram of which is illustrated in FIG. 4, comprising: a handwriting pad 41, an electromagnetic plate 42 and a processor 43.

The electromagnetic plate 42 is disposed under the handwriting pad 41 to sense a predefined gesture and determine a first set of coordinates for the predefined gesture, and to determine a second set of coordinates for the predefined gesture when the predefined gesture is sensed again via the electromagnetic plate 42.

The processor 43 compares to find if there is any difference between the first and second sets of coordinates and may determine the offset between the first and second sets of coordinates when the first set of coordinates is different from the second set of coordinates. In an embodiment, the processor may record, in the trace inputted, each coordinate of the trace in connection with the offset.

Additionally, before the predefined gesture is sensed via the electromagnetic plate, the processor may start synchronous note recording. More particularly, the processor may start synchronous note recording to ensure the content written down by the user on the piece of paper placed on top of the handwriting pad can be synchronously recorded into the electronic device and displayed on it. Without synchronous note recording, the content written down by the user on the piece of paper cannot be synchronously recorded into the electronic device, even if a handwriting pad is placed over an electromagnetic plate, a piece of paper is put on top of the handwriting pad, and the user writes on the piece of paper.

After the predefined gesture is sensed via the electromagnetic plate and the first set of coordinates for the predefined gesture is determined, and before the predefined gesture is sensed again via the electromagnetic plate, the processor is also used to record, in real-time, the trace inputted. Specifically, once the first set of coordinates for the predefined gesture is determined, the position of the piece of paper is determined, at this point, the content inputted again on the piece of paper is the content the user needs to save on the electronic device. Accordingly, after the first set of coordinates is determined, the trace inputted has to be recorded, in real-time, to ensure the trace inputted by the user with a pen can be electronically saved with continuity.

In the electronic device disclosed in the embodiment, a predefined gesture is sensed via an electromagnetic plate disposed under a handwriting pad. A first set of coordinates for the predefined gesture is determined. When the predefined gesture is sensed again via the electromagnetic plate, a second set of coordinates for the predefined gesture is determined. If the first and second sets of coordinates are different, the offset between them is then determined. Based on the offset between the first and second sets of coordinates, this method is able to determine the offset between the positions on the handwriting pad before and after a change so as to maintain continuous data inputted before and after the change of positions on the handwriting pad between its saved form on the electronic device and its inputted form on the handwriting pad. Therefore, the data inputted before and after the change of positions on the handwriting pad can be saved continuously on the electronic device.

Various embodiments in the specification are described in a progressive manner. The same or similar parts between the embodiments may be referenced to each other. In each embodiment, the portion that is different from other embodiments is focused on and described. For the devices disclosed in the embodiments, the descriptions are relatively brief, as they correspond to the methods disclosed in the embodiments. Please refer to the description of the methods for relevant points.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, at a handwriting pad of an electronic device, user input comprising a predetermined gesture and user handwriting input, the predetermined gesture being received before the user handwriting input;
   determining, using a processor, a first set of coordinates associated with the predetermined gesture;
   displaying, on a display screen associated with the electronic device, the user handwriting input:
   receiving, after the user input, another user input comprising another iteration of the predetermined gesture and additional user handwriting input, the another iteration of the predetermined gesture being received before the additional user handwriting input;
   determining, using a processor, a second set of coordinates associated with the another iteration of the predetermined gesture, wherein the second set of coordinates is different than the first set of coordinates;
   comparing the first and second sets of coordinates;
   determining, based on the comparing, an offset between the first and second set of coordinates;
   adjusting, based on the offset, a position of the additional user handwriting input to align with an end position of the user handwriting input; and
   displaying, on the display screen, the additional user input wherein the additional user input is displayed from the end position of the user handwriting input;
   wherein the predetermined gesture is written on piece of paper using a writing utensil and wherein the piece of paper is positioned over the handwriting pad of the electronic device;
   wherein the piece of paper is positioned at a first location during the receiving of the user input and is positioned at a second location during the receiving of the another user input.

2. The method of claim 1, wherein the user input and the another user input comprise user trace input comprising a plurality of segments, wherein the user trace input is different than the predetermined gesture.

3. The method of claim 2, wherein the receiving comprises receiving the predetermined gesture before receiving the user trace input.

4. The method of claim 3, further comprising determining, using a processor, a set of coordinates for each of the plurality of segments of the user trace input.

5. The method of claim 4, further comprising recording the set of coordinates for each of the plurality of segments of the user trace input.

6. The method of claim 5, wherein the recording comprises recording the set of coordinates for each segment of the user trace input in real time.

7. The method of claim 5, wherein the recording comprises adjusting, based on the determined offset between the first and second set of coordinates, the recorded set of coordinates to form a continuous user trace input.

8. The method of claim 1, further comprising activating, prior to receiving the user input, a synchronous recording feature.

9. An electronic device, comprising:
   a handwriting pad:
   a display screen:
   a processor;
   a memory device that stores instructions executable by the processor to:
   receive, at the display screen, user input comprising a predetermined gesture and user handwriting input, the predetermined gesture being received before the user handwriting input;
   determine a first set of coordinates associated with the predetermined gesture;
   display, on the display screen, the user handwriting input;
   receive, after the user input, another user input comprising another iteration of the predefined gesture and additional user handwriting input, the another iteration of the predetermined gesture being received before the additional user handwriting input;
   determine a second set of coordinates associated with the another iteration of the predetermined gesture, wherein the second set of coordinates is different than the first set of coordinates;
   compare the first and second set of coordinates;
   determine, based on the comparing, an offset between the first and second set of coordinates;
   adjust, based on the offset, a position of the additional user handwriting input to align with an end position of the user handwriting input; and display, on the display screen, the additional user input, wherein the additional user input is displayed from the end position of the user handwriting input;

wherein the predetermined gesture is written on piece of paper using a writing utensil and wherein the piece of paper is positioned over the handwriting pad of the electronic device;

wherein the piece of paper is positioned at a first location during the receiving of the user input and is positioned at a second location during the receiving of the another user input.

10. The electronic device of claim 9, wherein the user input and the another user input comprise user trace input comprising a plurality of segments, wherein the user trace input is different than the predetermined gesture.

11. The electronic device of claim 10, wherein the instructions executable by the processor to receive comprise instructions executable by the processor to receive the predetermined gesture before receiving the user trace input.

12. The electronic device of claim 11, wherein the instructions are further executable by the processor to determine a set of coordinates for each of the plurality of segments of the user trace input.

13. The electronic device of claim 12, wherein the instructions are further executable by the processor to record the set of coordinates for each of the plurality of segments of the user trace input.

14. The electronic device of claim 13, wherein the instructions executable by the processor to record comprise instructions executable by the processor to record the set of coordinates for each segment of the user trace input in real time.

15. The electronic device of claim 13, wherein the instructions executable by the processor to record comprise instructions executable by the processor to adjust, based on the determined offset between the first and second set of coordinates, the recorded set of coordinates to form a continuous user trace input.

16. A product, comprising:
a storage device that stores code, the code being executable by a processor and comprising:
code that receives user input comprising a predetermined gesture and user handwriting input, the predetermined gesture being received before the user handwriting input;
code that determines a first set of coordinates associated with the predetermined gesture;
code that displays the user handwriting input:
code that receives, after the user input, another user input comprising another iteration of the predetermined gesture and additional user handwriting input, the another iteration of the predetermined gesture being received before the additional user handwriting input;
code that determines a second set of coordinates associated with the another iteration of the predetermined gesture, wherein the second set of coordinates is different than the first set of coordinates;
code that compares the first and second sets of coordinates;
code that determines, based on the comparing, an offset between the first and second set of coordinates;
adjust, based on the offset, a position of the additional user handwriting input to align with an end position of the user handwriting input; and
display the additional user input wherein the additional user input is displayed from the end position of the user handwriting input;
wherein the predetermined gesture is written on piece of paper using a writing utensil and wherein the piece of paper is positioned over the handwriting pad of the electronic device;
wherein the piece of paper is positioned at a first location during the receiving of the user input and is positioned at a second location during the receiving of the another user input.

* * * * *